(12) United States Patent
Chen et al.

(10) Patent No.: US 9,817,646 B1
(45) Date of Patent: Nov. 14, 2017

(54) MULTIPLATFORM AND MULTICHANNEL DISTRIBUTION OF WEB APPLICATIONS ACROSS DEVICES

(71) Applicant: GOOGLE INC., Mountain View, CA (US)

(72) Inventors: Dan Chen, Kirkland, WA (US); Qian Huang, Sammamish, WA (US); Konstantin Ovechkin, Bellevue, WA (US); Antony John Sargent, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/216,457

(22) Filed: Mar. 17, 2014

(51) Int. Cl.
*G06F 9/445* (2006.01)
(52) U.S. Cl.
CPC ...................................... *G06F 8/61* (2013.01)
(58) Field of Classification Search
None
See application file for complete search history.

(56) References Cited

U.S. PATENT DOCUMENTS

| | | | |
|---|---|---|---|
| 7,257,583 | B2 | 8/2007 | Hofmeister et al. |
| 7,409,208 | B1 | 8/2008 | Clare et al. |
| 7,844,658 | B2 | 11/2010 | Woundy et al. |
| 8,213,921 | B2 | 7/2012 | Chen et al. |
| 8,255,924 | B2 | 8/2012 | Woundy et al. |
| 8,340,635 | B2 | 12/2012 | Herz et al. |
| 2002/0040326 | A1 | 4/2002 | Spratt |
| 2003/0221190 | A1 | 11/2003 | Deshpande et al. |
| 2004/0002943 | A1 | 1/2004 | Merrill et al. |
| 2004/0068721 | A1 | 4/2004 | O'Neill et al. |
| 2004/0098715 | A1 | 5/2004 | Aghera et al. |
| 2004/0203681 | A1 | 10/2004 | Ross et al. |
| 2005/0066324 | A1* | 3/2005 | Delgado et al. ............... 717/170 |
| 2006/0010392 | A1* | 1/2006 | Noel ..................... G06F 3/0481 715/759 |
| 2009/0119092 | A1* | 5/2009 | Balasubramanyan et al. ... 704/8 |

(Continued)

FOREIGN PATENT DOCUMENTS

WO      2013013166 A1      1/2013

OTHER PUBLICATIONS

Moor, "A Guide to the Android Market", http://www.talkandroid.com/guides/beginner/android-market-explained/, Feb. 7, 2010, 3 pages.

*Primary Examiner* — H S Sough
*Assistant Examiner* — Timothy Duncan
(74) *Attorney, Agent, or Firm* — Brake Hughes Bellermann LLP

(57) ABSTRACT

A method for installation of user device configured web applications includes receiving a request to install a web application, determining if the request is from a user device or a sync server, determining information about the web application based on at least one of a configuration, a platform and a setting associated with the user device, revising the determined information about the web application if the request is from the sync server, determining a logical location of stored files based on the web application and at least one of the configuration, the platform and the setting associated with the user device, and installing the web application using files stored in the determined logical location.

18 Claims, 8 Drawing Sheets

(56) References Cited

U.S. PATENT DOCUMENTS

| | | | |
|---|---|---|---|
| 2012/0137284 A1* | 5/2012 | Li | G06F 8/63 |
| | | | 717/178 |
| 2013/0024851 A1 | 1/2013 | Firman et al. | |
| 2013/0024852 A1 | 1/2013 | Firman et al. | |
| 2013/0047149 A1* | 2/2013 | Xu | G06F 8/60 |
| | | | 717/175 |
| 2013/0198720 A1* | 8/2013 | Maurice et al. | 717/122 |
| 2014/0025949 A1* | 1/2014 | Kay et al. | 713/168 |
| 2014/0310700 A1* | 10/2014 | Cupala | G06F 8/65 |
| | | | 717/171 |

* cited by examiner

MULTIPLATFORM AND MULTICHANNEL DISTRIBUTION OF WEB APPLICATIONS ACROSS DEVICES

TECHNICAL FIELD

This disclosure relates to the distribution of user device configured web applications available in an online marketplace.

BACKGROUND

When web applications are offered in an online marketplace, the web applications are offered without taking into consideration of user device configurations or settings. As a result, the web applications install (or add files) to the user device that are not needed for the web application to operate on the user device. For example, Chinese language files could be installed even though the web application will only use English on a particular user device. Therefore, there exists a need to develop a system and method to distribute web applications including files based on configurations/platforms and settings of a user device.

SUMMARY

In a general aspect, a method for installation of user device configured web applications is disclosed. The method includes receiving a request to install a web application, determining if the request is from a user device or a sync server, determining information about the web application based on at least one of a configuration, a platform and a setting associated with the user device, revising the determined information about the web application if the request is from the sync server, determining a logical location of stored files based on the web application and at least one of the configuration, the platform and the setting associated with the user device, and installing the web application using files stored in the determined logical location.

Implementations can include one or more of the following features. For example, the files may be stored in a file system having an organization based on at least one of the configuration, the platform and the setting associated with the user device, and determining the logical location may include searching a manifest file using search terms based on at least one of the configuration, the platform and the setting associated with the user device. A manifest file associated with the web application may include an entry corresponding to the logical location of stored files. Determining the logical location may include generating a search term based on at least one of the configuration, the platform and the setting associated with the user device, searching the manifest file for the search term, and returning a portion of the entry if the manifest includes the search term, the portion of the entry being a logical location of files for the web application.

For example, determining the logical location may include generating a search term based on at least one of the configuration, the platform and the setting associated with the user device, searching a database for the search term, and returning a logical location of files for the web application if the database includes a match for the search term. Determining the logical location may include determining a first logical location. Installing the web application may include using a first portion of files stored in the determined first logical location. The method may further include receiving a request to download a second portion of files for the web application, the request including an identification of the web application and information associated with the second portion of files, determining a second logical location based on the identification of the web application and the portion of files, and downloading the second portion of files from the determined second logical location.

For example, the receiving of the request to download the second portion of files may include receiving the request at an install application executed by the user device. The method may further include generating a uniform resource locator (URL) based on based on the identification of the web application and the portion of files, and downloading the second portion of files includes using the URL to retrieve the second portion of files from the second logical location. Determining of the second logical location may include generating a uniform resource locator.

In another general aspect, a method for distributing user device configured web applications is disclosed. The method includes receiving user device specific web application code, the user device specific web application code being developed based on at least one of a configuration, a platform and a setting associated with the user device, storing the user device specific web application code in an organized file system, the organized file system being based on at least one of the configuration, the platform and the setting associated with the user device, receiving a manifest file for the web application, the manifest file including an entry corresponding to the organized file system, and exposing the web application via a digital goods marketplace server.

Implementations can include one or more of the following features. For example, the organized file system may be further organized based on features associated with the web application. The web application code may be stored in the organized file system based on different operating systems of user devices that can execute the web application. The web application code may be stored in the organized file system based on languages associated with browsers of user devices. The web application code may be stored in the organized file system based on a 32-bit or 64-bit architecture of user devices. The steps of the method may further include determining a logical location of stored files for a requested web application based on the requested web application and at least one of the configuration, the platform and the setting associated with the user device and/or installing the requested web application using files stored in the determined logical location.

In yet another general aspect, a non-transitory computer readable medium storing code segments, that when executed by a processor, cause the processor to perform a number of steps. The steps include receiving a request to install a web application, determining if the request is from a user device or a sync server, determining information about the web application based on at least one of a configuration, a platform and a setting associated with the user device, revising the determined information about the web application if the request is from the sync server, determining a logical location of stored files based on the web application and at least one of the configuration, the platform and the setting associated with the user device, and installing the web application using files stored in the determined logical location.

Implementations can include one or more of the following features. For example, the files may be stored in a file system having an organization based on at least one of the configuration, the platform and the setting associated with the user device. Determining the logical location may include searching a manifest file using search terms based on at least one of the configuration, the platform and the setting associated with the user device. A manifest file associated with the web application may include an entry corresponding to the logical location of stored files. Determining the logical location may include generating a search term based on at least one of the configuration, the platform and the setting associated with the user device, searching the manifest file for the search term, and returning a portion of the entry if the manifest includes the search term, the portion of the entry being a logical location of files for the web application.

For example, determining the logical location may include generating a search term based on at least one of the configuration, the platform and the setting associated with the user device, searching a database for the search term, and returning a logical location of files for the web application if the database includes a match for the search term. Determining the logical location may include determining a first logical location. Installing the web application may include using a first portion of files stored in the determined first logical location. The steps of the method may further include receiving a request to download a second portion of files for the web application, the request including an identification of the web application and information associated with the second portion of files, determining a second logical location based on the identification of the web application and the portion of files, and downloading the second portion of files from the determined second logical location For example, the receiving of the request to download the second portion of files includes receiving the request at an install application executed by the user device. The steps of the method may further include generating a uniform resource locator (URL) based on based on the identification of the web application and the portion of files, and downloading the second portion of files includes using the URL to retrieve the second portion of files from the second logical location. The determining of the second logical location may include generating a uniform resource locator.

DETAILED DESCRIPTION

Figure 1:
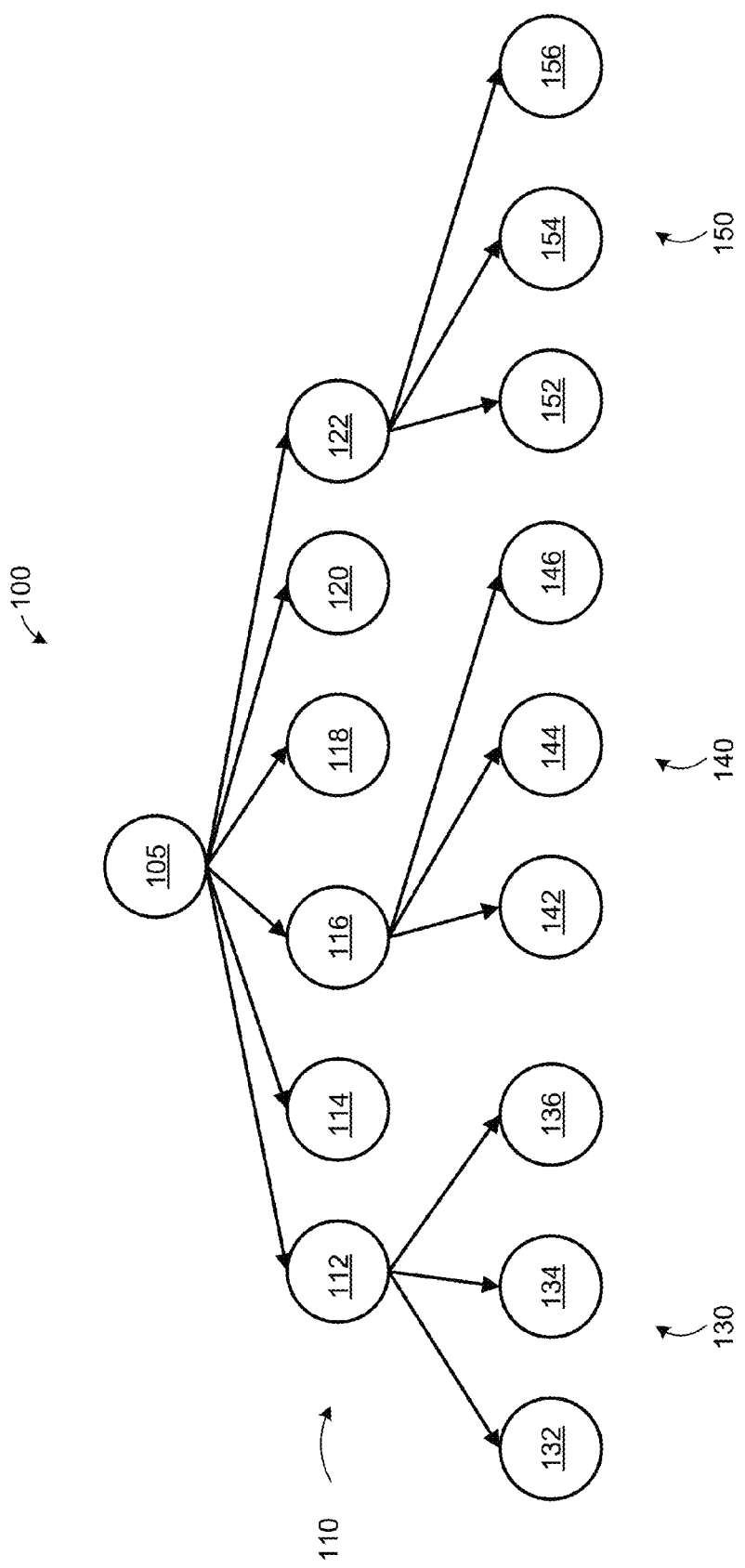
FIG. 1 is a block diagram showing nodes representing a file system.

FIG. 1 is a block diagram showing nodes representing a file system. Each node may represent a logical location configured to store files in file system 100. For example, each node may represent a directory or folder in the file system 100. For example, each node may represent folder configured to store binary packages for a web application. The folders may be organized for distribution of binary packages allowing different packages based on different internal architecture (e.g., operating systems, native client architecture (NACL)) and different device conditions (e.g., chrome versions, user agent). The file organization shown in FIG. 1 may allow the ability to distribute different binary packages to different groups of user devices and provide to only the parts that the user device needs. Accordingly, web applications can be synced on different platforms, where each platform might need a different NACL binary (e.g., x86, ARM, x32) possibly also for different OS (e.g., Windows®, Mac®, Linux®).

Further, the file system 100 can be based on localization (e.g., packages for voice support (language recognition)) in certain languages, certain font packages, and the like. In this way a web application developer can upload one giant package of things, and the needed parts of the package get distributed to people depending on platform and localization. Still further, the file system 100 can be organized to allow for A/B testing or beta testing (e.g., break down by test criteria) or distribution to development channel browsers, stable browsers, browser versions, US customers, and the like. In this way a web application developer can upload one giant package of things, and the needed parts get distributed to people depending on the particular criteria or channel through which the web application is to be distributed (e.g., multichannel distribution).

In FIG. 1, the nodes are organized with a root node 105, a first level (or branch) of nodes 110, and a plurality of second level (or branches) of nodes 130, 140, 150. The root node 105 may represent the base folder for web applications in a digital marketplace. In one example implementation, there may be a plurality of root nodes 105 associated with a plurality of servers where each of the servers implements some portion of the digital marketplace.

In the example of FIG. 1, the first level of nodes includes nodes 112, 114, 116, 118, 120 and 122. The first level of nodes 110 may be associated with a unique web application. For example, node 112 may be associated with a first web application (e.g., an image editing web application), noting that node 112 has an associated second level of nodes 130. Whereas, node 114 may be associated with a second web application (e.g., an email web application), noting that node 114 does not have an associated second level of nodes.

In the example of FIG. 1, the second level of nodes 130 includes nodes 132, 134, 136. The second level of nodes 140 includes nodes 142, 144, 146. The second level of nodes 150 includes nodes 152, 154, 156. As stated above, node 112 may be associated with a first web application (e.g., an image editing web application). Each of nodes 132, 134, 136 may represent folders including files based on different configurations, platforms and/or settings of a user device. For example, in an example implementation, a configuration may be based on a processor type of the user device (e.g., an ARM, x86, x32 and the like processor). For example, in an example implementation, a platform may be based on an operating system operating on the user device (e.g., 32-bit Windows®, 64-bit Windows®, Linux®, Chrome®, and the like). For example, in an example implementation, a setting may be based on a setting of a browser operating on the user device (e.g., a language, privacy, security, and the like).

For example, node 132 may represent a folder including files (for a web application) configured to execute on user device with a 32-bit Windows® operating system. Node 134 may represent a folder including files (for a web application) configured to execute on user device with a 64-bit Windows® operating system. Node 136 may represent a folder including files (for a web application) configured to execute on user device with a Linux® operating system.

In an example implementation, node 116 may be associated with another web application. Each of nodes 152, 154, 156 can represent folders including files based on different settings of a browser executing on a user device. In the example implementation, each of nodes 142, 144, 146 can represent folders including files based on different language settings of a browser executing on a user device. For example, node 142 may represent a folder including files configured to display English language documents or include audio files in English, node 144 may represent a folder including files configured to display Spanish language documents or include audio files in Spanish, and node 146 may represent a folder including files configured to display Chinese language documents or include audio files in Chinese.

In another example implementation, node 122 may be associated with a web application that may result in displaying text in different languages (e.g., a document editing web application). Each of nodes 152, 154 can represent folders including files based on different configurations and/or platforms a user device. For example, node 152 may represent a folder including files (for a web application) configured to execute on user device with a 32-bit Windows® operating system and node 154 may represent a folder including files (for a web application) configured to execute on user device with a 64-bit Windows® operating system. In this example implementation, node 156 may represent a default implementation folder. For example, node 156 may represent a folder including files (for a web application) configured to execute on user devices other than those using a 32-bit Windows® operating system and a 64-bit Windows® operating system.

As will be appreciated, different combinations of configurations and/or platforms and/or settings for a user device can be implemented in the file system 100 described with regard to FIG. 1.

Figure 2:
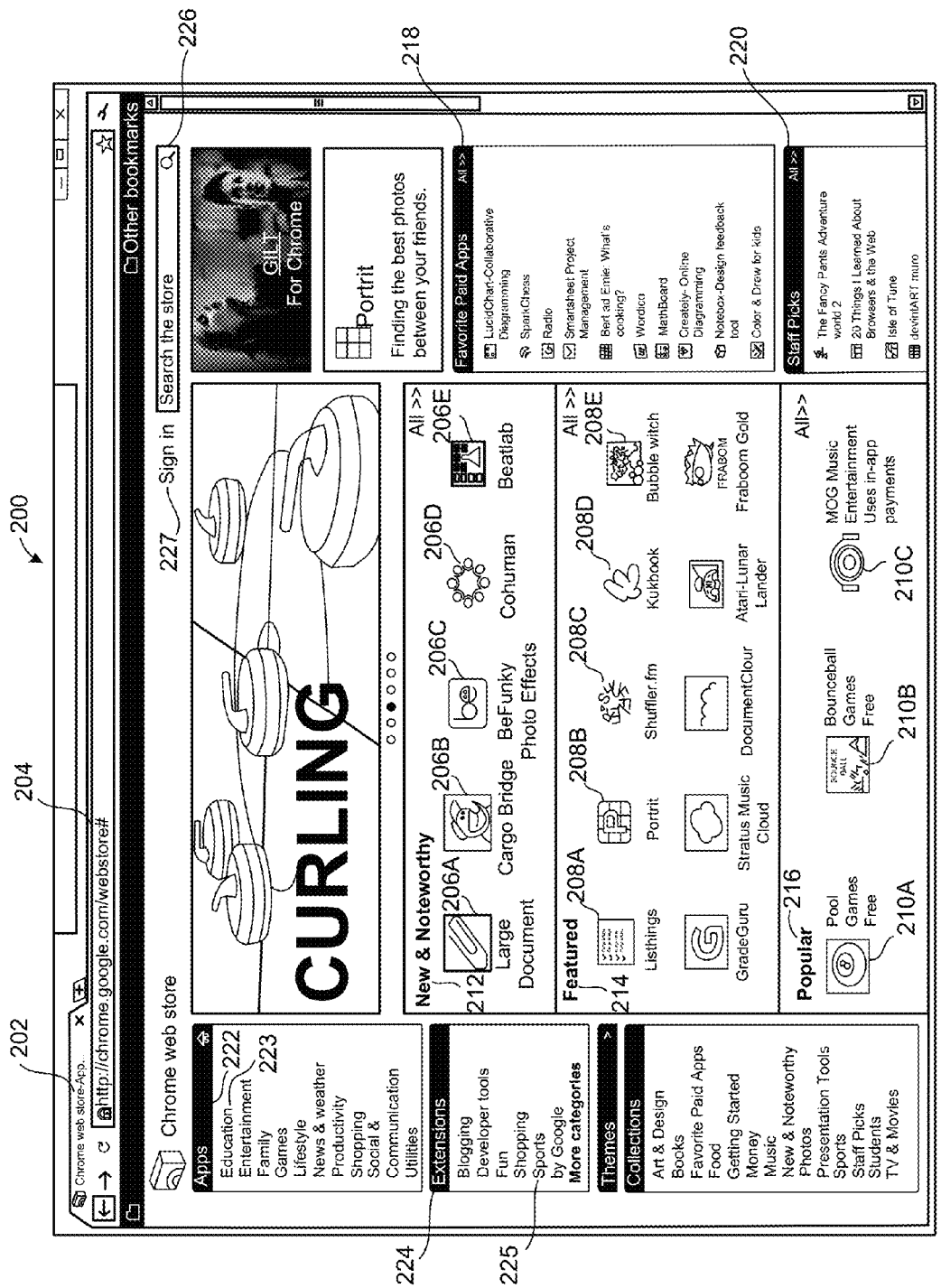
FIG. 2 is a screenshot of the user interface to a marketplace of digital goods.

FIG. 2 is a screenshot of a user interface 200 to a marketplace of digital goods. The user interface 200 can be displayed by a browser application that is executed by a computing device that may be connected to a network (e.g., the Internet). The browser application can open one or more tabs 202, one of which may display the user interface to the marketplace when a user navigates to a webpage identified by a uniform resource locator (URL) that provides content to the browser so that the browser can display the user interface to the marketplace in the tab.

The content provided by the webpage to the user can include a plurality of icons 206A, 206B, 206C, 206D, 206E, 208A, 208B, 208C, 208D, 208E, 210A, 210B, 210C that represent digital goods that can be downloaded from the webpage by the user for execution by a computing device controlled by the user. In some implementations, the digital goods can include any software or executable code (e.g., a desktop software program, a native application, a digital media file, such as a song or a movie, etc.). In some implementations, the digital goods can include web applications and browser extensions that can be downloaded from the marketplace to a client computing device where they can be installed on the computing device for execution by a web browser running on the computing device. In this context, a "web application" may be configured to perform a single task or multiple tasks for a user. In such an implementation, the web application may be configured to be executed or interpreted by the web browser. This is compared with native applications that include machine executable code and are configured to be executed directly by a processor or via the operating system of the client computing device, whereas a web application may be incapable of execution or display without the aid of the web browser. Thus, web applications can be run inside a browser with a dedicated user interface, and typically provide functionality and an experience that is more rich and interactive than a stand-alone website but less cumbersome and monolithic than a desktop application. Examples of web applications include office applications, games, photo editors, and video players that are run inside the browser.

A web browser executed by a client device can receive code (e.g., HTML code) from a remote server (e.g., a remote server that hosts a website) and can execute the received code on the client device for the benefit of a user of the client device.

In various implementations, the web browser may include or have installed one or more web applications. In this context, a "web application" may be configured to perform a single task or multiple tasks for a user. In such an implementation, the web application may be configured to be executed or interpreted by the web browser. Thus, web applications can be run inside a web browser with a dedicated user interface, and may provide functionality and an experience that is more rich and interactive than a stand-alone website but are less cumbersome and monolithic than a desktop application. Examples of web applications include games, photo editors, and video players that are run inside the browser.

Web applications can include "hosted web applications," or "packaged web applications." Hosted web applications can request, and be granted, additional permissions to use local resources of a client computing device, beyond what typical code executed by a browser is permitted to use (e.g., such as, the ability to use more than the normal quota of temporary storage space, use geolocation features without additional confirmation prompts beyond a single install-time one, and the ability to always have a hidden page open which is performing tasks such as synchronizing data for offline use or receiving server-pushed notifications to display to the user). Hosted web applications also get special treatment in a user interface, in that hosted web applications may be shown with a large icon that can be clicked to launch the application either in a tab or in a standalone (possibly full screen) window.

Packaged applications can be thought of as web applications whose code is bundled, so that the user can download all of the content of the web application for execution by the browser or in a standalone window. A packaged web application may not need to have network access to perform its functionality for the user, and rather may be executed successfully by the browser locally on the computing device without access to a network.

Packaged web applications have the option of using extension application programming interfaces (APIs), allowing packaged apps to change the way the browser behaves or looks. In some cases, a packaged web application may operate without appearing to run in a browser, e.g., without the browser "chrome", tabs, or other user interface of the browser. In such a case, the packaged web application would operate in a standalone window without access to content scripts or APIs related to browser state such as cookies, history, bookmarks, open tabs, etc. In various cases, packaged web applications may access USB drives, BLUETOOTH devices, open raw network sockets, act as servers, or access the local filesystem, as examples.

In various examples, the web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JAVASCRIPT, and CSS. Extensions may have little or no user interface. In some implementations, extensions may provide a small user interface icon or other user interface that may modify a browser's "chrome", which is defined herein to include an area outside of a webpage displayed in the browser (such as the borders of a web browser window, which include the window frames, menus, toolbars and scroll bars). Selecting the icon or the other user interface may activate the functionality of the extension within the browser.

Thus, browser extensions also provide extra functionality to a browser, but generally, unlike web applications, there is little or no user interface component to the functionality provided by an extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed, for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page.

Extensions may modify websites, for example to block advertisements, to increase a zoom level on pages, or read strings of text and pass those to a text to speech engine for a blind user. A developer may want injected code from an extension to communicate to the rest of the extension. For example, an extension may remove all images from a news website. The extension may establish a communication channel back to the rest of the extension running in its own process in the browser, using a content script. Because content scripts run in the context of a web page and not the extension, they often need some way of communicating with the rest of the extension. For example, an RSS reader extension might use content scripts to detect the presence of an RSS feed on a page, then notify the background page in order to display a page action icon for that page. Communication between extensions and their content scripts works by using message passing. Either side can listen for messages sent from the other end, and respond on the same channel. A message can contain any valid object (e.g., a JSON object such as null, boolean, number, string, array, or object).

Packaged web applications, in contrast to browser extensions, may look and feel like native applications, with a big-screen design and rich user interface. Both extensions and packaged web applications may bundle all their files into a single file (e.g., .CRX file) that a user downloads and installs. This bundling means that, unlike hosted applications, extensions and packaged web applications do not need to depend on content from the web. Browser extensions and web applications may be distributed via a trusted web store, or via individual websites, as examples.

In some implementations, the API (and/or web API)) may be an element of a web browser as discussed above. However, in some implementations, the API (and/or web API)) may be an element of a web based operating system (Browser-OS). A Browser-OS may be a bootable version of a web browser (including a browser, a media player and a file system). The Browser-OS may store all of a user applications and data on the Web, as opposed to a local hard drive. The Browser-OS (e.g., Chrome-OS®) may replace a traditional operating system.

A web browser and/or a Browser-OS may include an associated runtime. A runtime (also called a runtime system or a runtime environment) can implement some behavior (e.g., low-level (e.g., core) and/or high-level (e.g., type checking, garbage collection and/or debugging)) of a computer language (e.g., HTML and/or JAVASCRIPT) or program (e.g., a web browser). Any computer language can implement some form of runtime, whether the language is a compiled language, interpreted language, embedded domain-specific language, or is invoked via an API. In some implementations, the runtime can retrieve a background page, return details about a manifest, and listen for and respond to events in the app or extension lifecycle. The runtime can convert the relative path of URLs to fully-qualified URLs. In some implementations, the runtime can manage the app lifecycle. The app runtime manages app installation, controls the event page, and can shut down the app at anytime.

With a packaged web application, a user may be comfortable with downloading and installing the application and giving the packaged web application a high level of access to the computing device because the packaged web application has gone through a verification and validation process before the packaged web application listed in a digital marketplace. Therefore, the user trusts that the downloaded code will not be malicious, even though the code has been given a high level of access to the computing device.

By contrast, a hosted web application, even if the application has been approved in the digital marketplace, is essentially nothing more than then a URL to a website plus some metadata that defines some permissions. Because the code at the website pointed to by the URL can change, users should be reluctant to grant a high level of access to the computing device to a hosted web application because the code may become malicious even if the code had been previously approved.

Within the user interface 200, the installable web applications can be displayed in a manner that is organized to help a user decide which applications may be useful or relevant to the user. For example, the user interface 200 can include a category 212 of applications represented by icons 206A, 206B, 206C, 206D, 206E that have been recently released in the marketplace and which a curator of the marketplace may deem to be especially noteworthy to users. In one implementation, the applications represented by icons 206A, 206B, 206C, 206D, 206E, 206F shown in the category 212 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications represented by icons 206A, 206B, 206C, 206D, 206E, 206F can be displayed within the category 212. That is, the applications represented by icons 206A, 206B, 206C, 206D, 206E, 206F shown in the New and Noteworthy category 212 of the user interface 200 can be a subset of a larger number of applications that also could qualify as being new and noteworthy but which have not been selected for display in the user interface 200. A variety of signals that can be used to rank and select the subset of applications as described in more detail below.

In another example, the user interface 200 can include a category 214 of applications represented by icons 208A, 208B, 208C, 208D, 208E that have been selected to be featured for display in the user interface 200. The applications represented by icons 208A, 208B, 208C, 208D, 208E that are selected to be featured in the category 214 can be selected based on criteria evaluated by a curator of the market place. For example, the curator may select the applications represented by icons 208A, 208B, 208C, 208D, 208E for display in the category 214 from a much larger set of applications based on the curator's opinion of the quality, popularity, or utility of the selected applications. In another implementation, the curator may select the applications represented by icons 208A, 208B, 208C, 208D, 208E based upon payments made by developers of the applications in return for prominent display of the applications in the user interface 200.

In another example, the user interface 200 can include a category 216 of applications represented by icons 210A, 210B, 210C that have been selected for display in the category 216 of the user interface 200 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. Then, applications within the marketplace can be ranked based on their user rating. In one implementation, applications with the highest average rating can be ranked highest. In another implementation, applications with the highest number of five-star ratings can be ranked highest. Then, applications represented by icons 210A, 210B, 210C with the highest rankings can be selected for display in the user interface 200 of the marketplace.

The user interface 200 of the marketplace also can include categories of applications in other sub-portions of the user interface 200 in which smaller icons are used to represent the applications that are used in categories 212, 214, 216. For example, category 218 can display "Favorite Paid Apps," which can be applications for which a user must pay money before being able to download and install the application on the user's computing device. Applications listed in the Favorite Paid Apps category 218 can be the most frequently downloaded and/or most frequently installed applications for which the user must pay money. In another example, category 220 can display "Staff Picks," which can be applications that are selected by a curator at the marketplace based on the selected applications being deemed especially interesting to users who visit the marketplace in search of applications.

Within the user interface 200, categories 212, 214, 216, 218, 220 can display a subset of applications that are categorized to fall within the category. Because screen space within the user interface is limited, only a subset of the applications that fall within a category may be displayed within the user interface 200. However, by selecting a hyperlink associated with the category, more applications that fall within the category can be displayed to a user. For example, each category 212, 214, 216, 218, 220 is associated with a hyperlink labeled "All," the selection of which may cause more applications that fall within the category to be displayed.

Other parts of the user interface 200 also can be used to organize the digital goods that are available in the marketplace. For example, an "Apps" section 222 can provide a list of hyperlinks, which each can be selected to display applications that belong to a category identified by the hyperlink. For example, selection of the "Education" hyperlink 223 can cause a group of icons that represent applications related to educational topics to be displayed. In another example, an "Extensions" section 224 can provide a list of hyperlinks, which each can be selected to display extensions that belong to a category identified by the hyperlink, where an extension is executable code that extends the functionality of a browser. For example, selection of the "Sports" hyperlink 225 can cause a group of icons that represent extensions related to sports topics to be displayed.

In addition to locating digital goods (e.g., Web applications and extensions) that are already displayed within a category 212, 214, 216, 218, 220 of the user interface 200, which could be displayed as a result of selecting a hyperlink 223, 225, digital goods also can be located as a result of a query for goods that may be of interest to the user. For example, a user may enter query terms into an query box 226 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 200.

The user interface 200 also includes a hyperlink 227 that can be selected so that the user can log into the marketplace. For example, selection of the hyperlink 227 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 200, where the selection of the goods can be personalized to the user based on data associated with the user's account.

Figure 3:
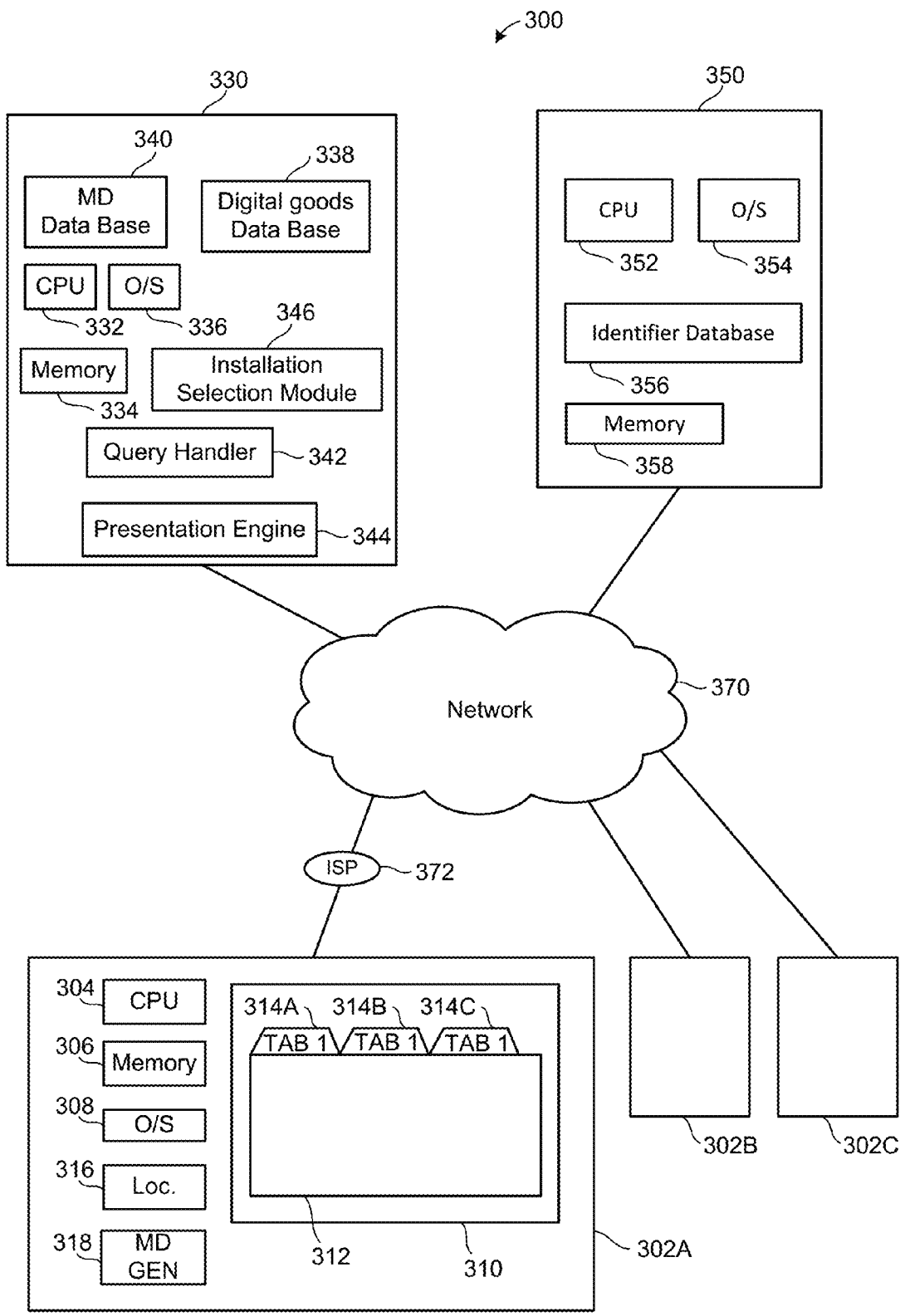
FIG. 3 is a schematic diagram of a system for distributing digital goods in a marketplace.

FIG. 3 is a schematic block diagram of an example embodiment of a system 300 for distributing digital goods in a marketplace. In various embodiments, the system 300 may include client computing devices (e.g., desktop computers, notebook computers, netbook computers, tablet computers, smart-phone, etc.) 302A, 302B, 302C. A client computing device 302A can include one or more processors 304 and one or more memories 306. The client computing device 302A can execute an operating system 308 and a browser application 310 that which may display a user interface window 312. The client computing device 302A can include a location detector 316, which may automatically detect a location of the computing device, for example, based on global positioning system (GPS) signals, or by triangulation of signals from transmitters at known locations, or by using other hardware and/or techniques.

In one embodiment, the client computing device 302A may be running or causing the operating system 308 to execute an application 310 or window 312. For purposes of illustration the window 312 is referred to as a web browser. However, it is understood that the above is merely one illustrative example to which the disclosed subject matter is not limited. In various embodiments, this window 312 may include a plurality of panes or tabs 314A, 314B, 314C. The window 312 can be a visual area, usually rectangular, containing some kind of user interface. In a graphical user interface (GUI) used in the client computing device 302A, the window 312 can be a two-dimensional object arranged on a plane of the GUI known as the desktop. The window 312 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individuals tabs 314A, 314B, 314C. These tabs 314A, 314B, 314C are typically displayed one at a time, and are selectable via a tab-bar which often resides above the contents of an individual window. That is, one selected tab 314A is "forward-facing" and displays information or content to a user in the window 312, with the content of other tabs 314B, 314C is "hidden."

The client computing devices 302A, 302B, 302C may receive online content from one or more server computing devices 330 that may be connected to the client computing device 302 through a network 370. Each of the client computing devices 302A, 302B, 302C can be connected to the network 370 through a local Internet Service Provider (ISP) 372. The received online content can be processed and displayed in the window 312 (e.g., in a on a tab 314 of the window 312). For example, the window 312 can display a user interface of a marketplace for digital goods, similar to the user interface of the marketplace described herein, to a user. A user can interact with the displayed content, and an activity metadata generator 318 can monitor the user's interactions with the content and the performance of the application 310 and can generate activity metadata based on the user's interactions with the content and based on the performance of the application 310.

A location of the client computing device 302A can be determined based on a location associated with the ISP 372. For example, a known location of the ISP can be used as an approximation or as a proxy for the location of the client computing device 302A.

The client computing device 302A can communicate with a digital goods marketplace server 330 that provides a marketplace for digital goods to client computing devices 302A, 302B, 302C. The marketplace server 330 can include one or more processors 332 and one or more memories 334. The marketplace server 330 can execute an operating system 336 and various applications and services to provide functionality to the client computing devices. For example, in one implementation, the marketplace server 330 can include a repository for a database of digital goods database 338, and the digital goods can be served from, or downloaded from, the repository to the client computing devices 302A, 302B, 302C. In another implementation, the digital goods can be stored in, and served to client computing devices 302A, 302B, 302C from, a repository that is remotely located from the marketplace server. For example, digital goods could be stored and served to client computing devices 302A, 302B, 302C from individual repositories that are operated and controlled by developers of the digital goods, and digital goods database 338 of the marketplace server 330 can provide just a reference to the individual repositories that are operated by the developers.

The marketplace server 330 can include a metadata database 340 that stores metadata associated with the digital goods that are available from or referenced by the digital goods database 338. The metadata associated with a digital good can include a variety of information about the digital goods including, for example, information about the digital goods that are available from the digital goods database 338. Such information can include, for example, representative keywords associated with the digital goods, the price associated with the digital goods. The metadata may also include demographic data about targeted users of the digital good, a time of year month or day during which the digital goods may be of the highest interest to a user, etc. For example, metadata associated with the surfing videogame may indicate that the good is intended for use by male users between the ages of 15 and 34, who live in coastal California or Hawaii, and that the game may be more popular during summer months than during winter months.

The marketplace server 330 can include query handler 342 that can be configured to receive and process queries for digital goods available in the marketplace. For example, the query handler can receive queries for digital goods that are entered into query box 226 of the user interface 200 shown in FIG. 2. Terms or phrases of the queries then can be compared to terms and phrases (e.g., terms and phrases stored in the metadata database 340) that are used to index the digital goods available in the marketplace. Based on the comparison, a subset of digital goods can be selected from the digital goods database 338 with which to respond to the query.

The marketplace server 330 can include a presentation engine 344 that prepares information for transmission to the client computing devices 302A, 302B, 302C, where the information is used by the client computing devices to display a user interface 200 that shows representations of selected digital goods available in the marketplace. For example, the presentation engine 344 can prepare HTML code, XML code, etc., that determines the information that is displayed to a user in the user interface 200 and where the code determines which digital goods will be displayed in the user interface 200 to the user.

The marketplace server 330 can include an installation selection module 346. The installation selection module 346 may be configured to select a file location to serve digital goods to client computing devices 302A, 302B, 302C based on selected digital goods and based on a configuration, a platform and/or a setting associated with client computing devices 302A, 302B, 302C. For example (referencing FIG. 1 above), a user of client computing device 302A may select an image editing web application associated with node 112. The installation selection module 346 may determine that operating system 308 of client computing device 302A is a 32-bit Windows® operating system. Therefore, installation selection module 346 selects a folder corresponding to node 132 to serve files to client computing device 302A for the selected image editing web application.

In an example implementation, the installation selection module 346 searches the manifest file of the selected web application to be installed based on a configuration of the device that the web app will be installed on, a platform and/or a setting associated with client computing devices 302A, 302B, 302C in order to determine the location of the folder. In another example implementation, the installation selection module 346 searches the metadata database 340 based on the selected web application, a configuration, a platform and/or a setting associated with client computing devices 302A, 302B, 302C in order to determine the location of the folder. In yet another example implementation, the installation selection module 346 searches the digital goods database 338 based on the selected web application, a configuration, a platform and/or a setting associated with client computing devices 302A, 302B, 302C in order to determine the location of the folder. In either example, the location of the folder may be a logical location.

As shown in FIG. 3 the system 300 can also include a sync server 350 that includes one or more processors 352, one or more memories 358, an operating system (O/S) 354, and an identifier database 356. The identifier database 356 can store unique identifiers to enable syncing between various user sessions on different client computing devices e.g., client computing devices 302A, 302B and/or 302C.

For example, in some implementations, a user account allows a user to authenticate to system services (e.g., web applications) and receive authorization to access them. To log into a user account, a user may authenticate herself with a password or other credentials for the purposes of accounting, security, and resource management, for example. Once the user has logged on (e.g., to a web browser, to a computing device, etc.), an operating system may use an identifier such as an integer to refer to the user, rather than a username. For example, the username may be correlated with a user identifier. A system (e.g., sync server 350) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

In some implementations, for example, when a user signs into a web browser or a certain device, all of the user's bookmarks, extensions, web applications, theme, other browser preferences and/or settings may be loaded from and/or in coordination with a sync server 350 via a network 370. Accordingly, the user's bookmarks, extensions, web applications, theme, other browser preferences and/or settings and/or information related thereto may be saved (e.g., in memory 358) and synced to a user's account (e.g., using identifier database 356). The user can then load these settings anytime the user signs into the web browser on other computers and devices. Changes to browser settings, for example, may be synced instantaneously to the account, and may be automatically reflected on other computers where the user has signed in (and enabled syncing).

In an example implementation, the sync server 350 may coordinate with the marketplace server 330 to select a file location to serve digital goods to client computing devices 302A, 302B, 302C based on selected digital goods and based on a configuration, a platform and/or a setting associated with client computing devices 302A, 302B, 302C where settings are stored in or in association with the sync server 350. For example, during a syncing process a web application may be downloaded to the computing device 302A. Accordingly, a browser preference (e.g., language) may be communicated from the sync server 350 to the marketplace server 330 so that the marketplace server 330 can select a folder to download the web application based on the setting (e.g., browser preference). In other words, settings that are stored in the sync server 350 may override settings communicated by the client computing device because the client computing device may eventually be reconfigured during the sync operation.

Changes to settings on one computing device may be automatically copied (e.g., via sync server 350) from other computers (for example, if the user has enabled that sync feature). Synced data may be encrypted when it travels between computing devices to keep information secure. Further, passwords may be encrypted on computing devices using a cryptographic key. The sync server 350 may include a central service configured to hash settings that detects if suddenly a large number of devices request hashes for specific new settings and in this case refuse to provide hashes. The sync server 350 may include user submitted information about inconsistencies that are then used to build or improve a model to calculate confidence. The sync server 350 may report detections of inconsistencies to estimate the magnitude of infection rates.

Accordingly, information associated with browser settings (as well as the settings themselves) may be read from a file (e.g., XML file) or data store (e.g., database) downloaded (e.g., synchronized) from the sync server 350 and stored in memory 358. The identifier database 356 may access the file and/or data store in order to supplement and or generate the information about settings. This information about settings may be communicated to the marketplace server 330 for use during the syncing process (e.g., selecting and downloading web applications).

Figure 4:
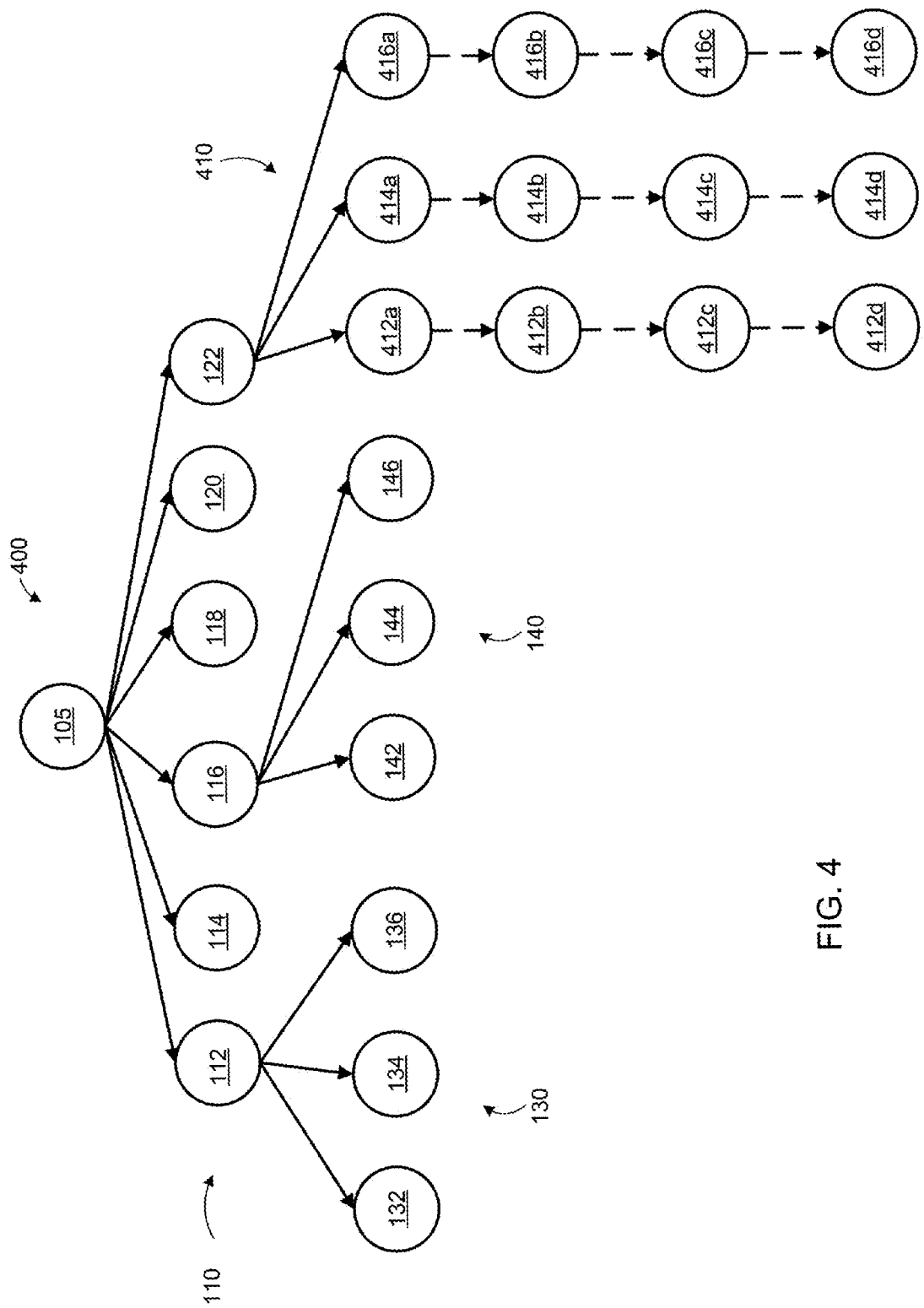
FIG. 4 is another block diagram showing nodes representing a file system.

FIG. 4 is a block diagram showing nodes representing a file system. Each node may represent a logical location configured to store files in file system 400. For example, each node may represent a directory or folder in the file system 400. In FIG. 4, as is discussed above with regard to FIG. 1, the nodes are organized with a root node 105, a first level (or branch) of nodes 110, and a plurality of second level (or branches) of nodes 130, 140. FIG. 4 further includes a modified second level (or branches) of nodes 410. Although one second level of nodes 410 is shown, this disclosure is not limited thereto. The second level of nodes 410 includes a plurality of sub-nodes 412a, 412b, 412c, 412d, 414a, 414b, 414c, 414d, 416a, 416b, 416c, and 416d. Each sub-node nodes 412a, 412b, 412c, 412d, 414a, 414b, 414c, 414d, 416a, 416b, 416c, and 416d may represent a logical location configured to store files in file system 400.

The files associated with the sub-nodes nodes 412a, 412b, 412c, 412d, 414a, 414b, 414c, 414d, 416a, 416b, 416c, and 416d may correspond to an incremental installation or download of a web application. In other words, a first sub-node (e.g., sub-node 412a) may represent a logical location configured to store files necessary to minimally execute a web application. Each subsequent sub-node (e.g., sub-nodes 412b, 412c, 412d) may represent a logical location configured to store files to extend, enhance, add features for execution of the web application. For example, if the web application is a gaming application, the sub-node (e.g., sub-node 412a) may represent a logical location storing files associated with base execution of the gaming application and a first number of skill levels (e.g., 1-5). Each subsequent sub-node (e.g., sub-nodes 412b, 412c, 412d) may represent a logical location storing files associated with additional skill levels. For example, sub-node 412b may store levels 6-10, sub-node 412c may store levels 11-15, sub-node 412d may store levels 16-20, and so on.

Accordingly, installation selection module 346 (during an added feature installation) may be further configured to identify the web application requesting the added feature and the feature to be added. Using the identification of the web application requesting the added feature and the feature to be added, the installation selection module 346 may then be configured to determine and select the corresponding location (represented as a sub-node) to download (or serve) the add-on files from.

Figure 5:
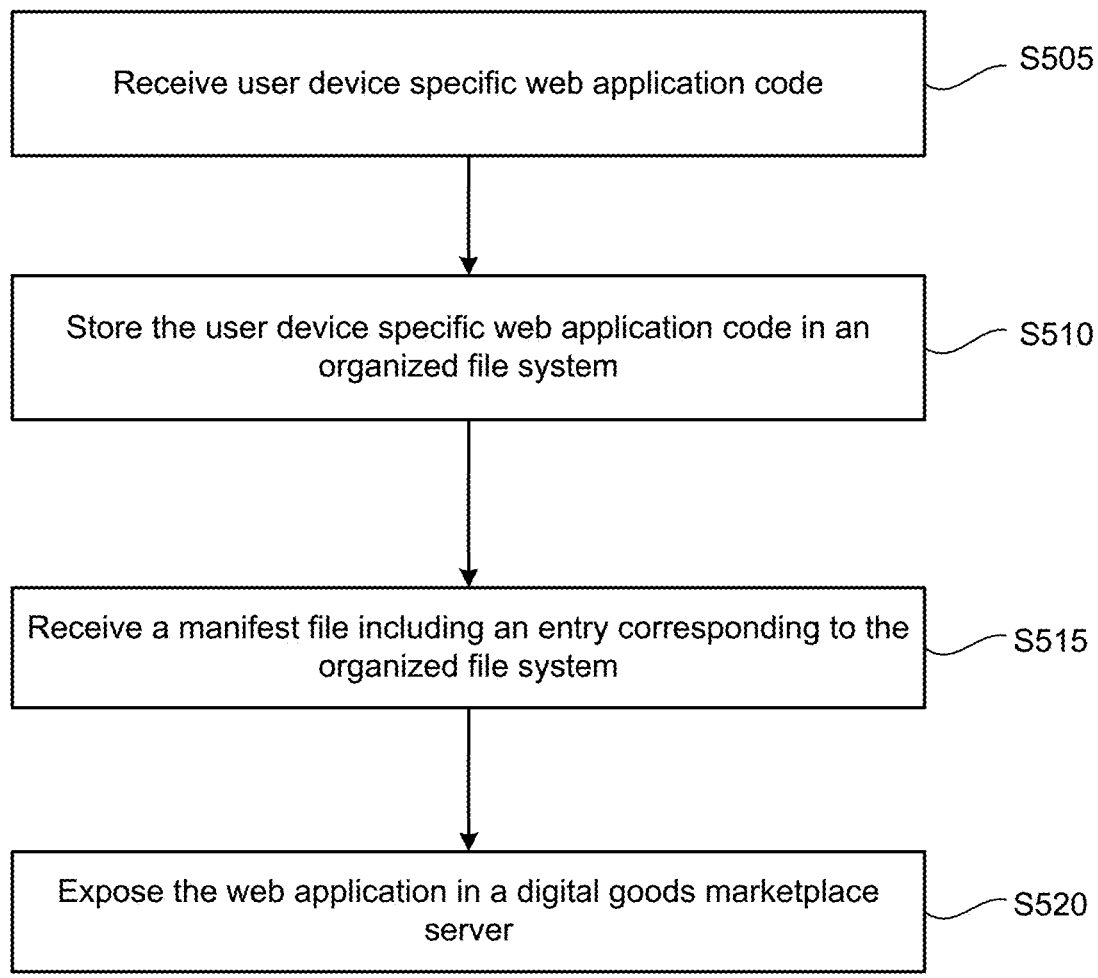
FIGS. 5-7 are flowcharts of a process for distribution of user device configured web applications.
Figure 6:
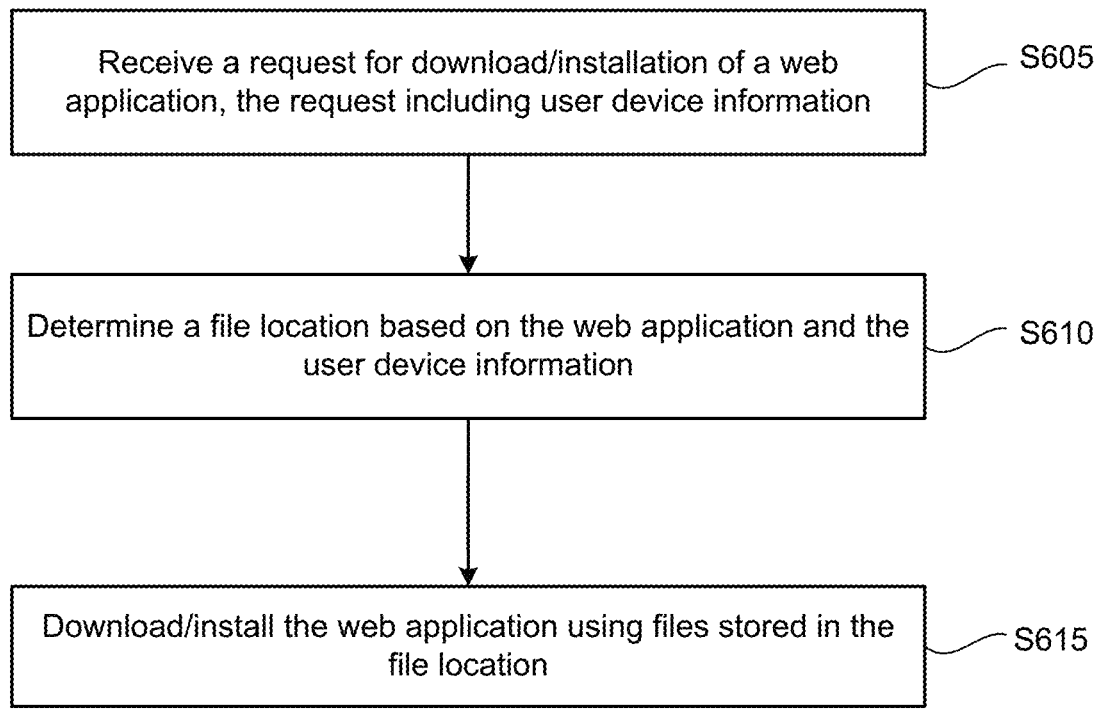
Figure 7:
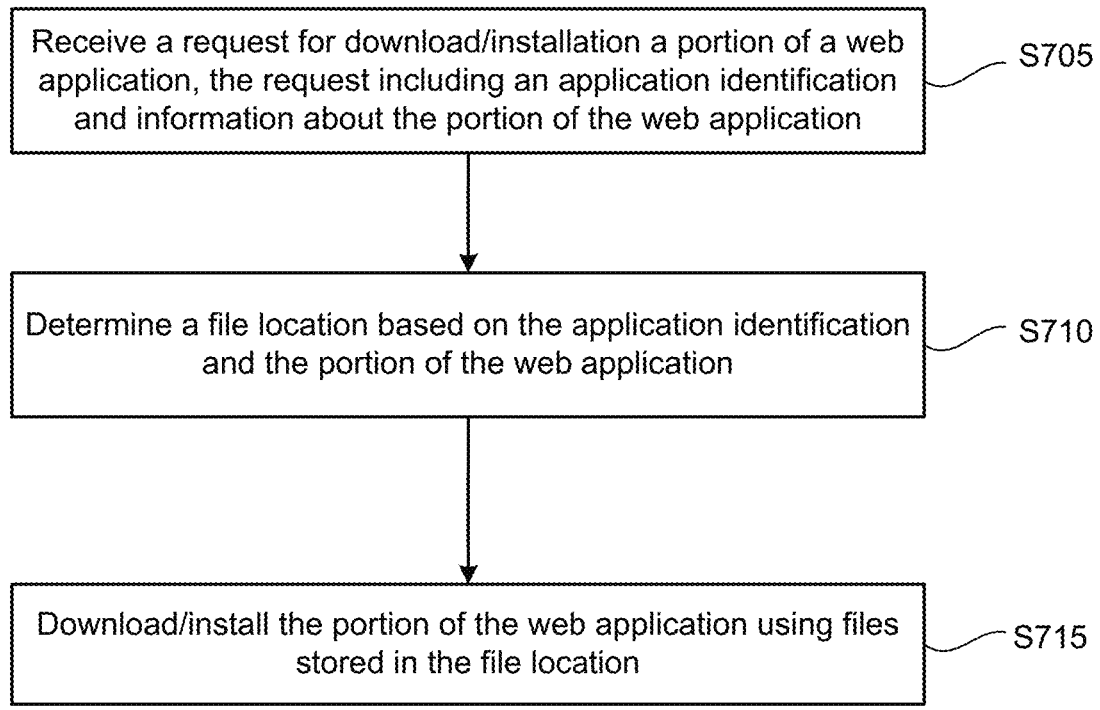

FIGS. 5-7 are flowcharts of methods according to example embodiments. The steps described with regard to FIGS. 5-7 may be performed due to the execution of software code stored in a memory (e.g., at least one memory 306, 334) associated with an apparatus (e.g., as shown in FIG. 3) and executed by at least one processor (e.g., at least one processor 304, 332) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 5-7.

FIG. 5 is a flowchart of a process for distribution of user device configured web applications. For example, distribution of different binary packages used with web applications based on user device characteristics. In FIG. 5, a developer of a web application configures the web application as a user device configured web application and makes the web application available for download on a digital goods marketplace. As shown in FIG. 5, in step S505 user device specific web application code is received (e.g., by marketplace server 330). User device specific web application code may be code developed (e.g., by a web application developer) that has been or can be organized based on a user device configuration, platform and/or settings. For example, a web application may be used with a script (e.g., Javascript) file or compiled code (e.g., C, C++) configured to execute on a client computing device (e.g., client computing device 302A). The script file can be optimized based on a configuration and/or a platform of the client computing device. Compiled code may require an associated native client to execute. For example, if the client computing device is executing a 64-bit or 32-bit operating system (e.g., operating system 308), the script can be optimized for the 64-bit or 32-bit operating system. Further, compiled code can be compiled for an ARM, x86, x32 and the like processor. For example, if the client computing device is executing a Windows 7®, a Windows 8® or a Linux® operating system (e.g., operating system 308), the script can be optimized for the Windows 7®, Windows 8® or Linux® operating system. Therefore, the developer may generate/develop/compile code that is optimized based on a configuration and/or a platform of target client computing devices.

In another example, a web application may include language specific documentation, images, headers, information, and the like. Therefore, the developer may generate/develop files for distribution with the web application. In yet another example, a web application may include files to extend, enhance, and/or add features for execution of the web application (e.g., game skill levels). Therefore, the developer may generate/develop/compile code as files to extend, enhance, and/or add features for execution of the web application.

In step S510 the user device specific web application code is stored (and organized) in an organized file system. For example, as discussed above with regard to FIGS. 1 and 4, a file system (or organization of files) may be developed based on the user device specific web application code. For example, separate folders (shown as nodes in FIGS. 1 and 4) may be generated to store the 64-bit or 32-bit operating system files, to store the Windows 7®, Windows 8® or Linux® operating system, to store different languages or add-ons. Further, separate folders to store any combination of a configuration, a platform and/or a setting may be developed. The corresponding files, pages scripts, and the like are then stored in the folders. The organized file system may be elements of a compressed (e.g., zip, tar, etc.) file. The files may include web pages (e.g., HTML5 files) making up the application; scripts or executable code (e.g., JavaScript files) that may execute in conjunction with the web pages (and are optimized for a configuration and/or a platform); Cascading Style Sheets (CSS) used for describing the look and formatting of the web pages; and a manifest file.

In step S515 a manifest file is received. The manifest file includes an entry corresponding to the organized file system is developed. The manifest file may include a name, a description, a version, URL's for external files, a launch web page, container settings (e.g., height and width), backgrounds, icons, keys, permissions, and the like. A code listing for a typical manifest file is shown below as LISTING 1.

```
"name": "Google Mail",
    "description": "Read your gmail",
    "version": "1",
    "app": {
    "urls": [
        "*://mail.google.com/mail/",
        "*://www.google.com/mail/"],
    "launch": {
        "web_url": "http://mail.google.com/mail/"
    }
    },
    "icons": {
    "128": "icon_128.png"
    },
    "permissions": [
    "unlimitedStorage",
    "notifications"]
```

Listing 1

A code listing for a manifest file according to example embodiments is shown below as LISTING 2.

```
{
"name": "app_name",
    "version": "version",
    "manifest_version": 2,
    "description": "description_text",
    "container": {
    "Windows 7", "~base/Windows 7"
    "Windows 7-English", "~base/Windows 7-English"
    "Windows 7-Spanish", "~base/Windows 7-Spanish"
    "Windows 7-Chinese", "~base/Windows 7-Chinese"
    "Windows 8", "~base/Windows 7"
    "Windows 8-English", "~base/Windows 8-English"
    "Windows 8-Spanish", "~base/Windows 8-Spanish"
    "Windows 8-Chinese", "~base/Windows 8-Chinese"
    "Linux", "~base/Linux"
    "Linux-English", "~base/Linux-English"
    "Linux-Spanish", "~base/Linux-Spanish"
    "Linux-Chinese", "~base/Linux-Chinese"
    "Linux-English", "~base/ARM-Linux-English"
    "Default", "~base/Default"
    },
    "icons": {
    "128": "icon_128.png"
    },
    "app": {
```

```
"launch": {
    "web_url": "http://yoursite.com"
    }
  }
}
```

Listing 2

In step S520 the web application is exposed (e.g., made available for download to a client computing device) by a digital goods marketplace server. For example, the compressed file is added to the digital goods database 338 and information about the web application is added to the metadata database 340. Loading the application may be accomplished using a developer dashboard, which may be a software tool used by a developer to upload and maintain web applications developed by a developer. The web application may also be published. Publishing a web application exposes the loaded web application to the world (e.g., public), and allows the web application to be visible in the digital goods marketplace search results. A web application may also be private, as such the web application may be exposed to a limited group with permissions to access the web application.

FIG. 6 is a flowchart of a process for distribution of user device configured web applications. In FIG. 6, a web application configured as a user device configured web application available for download on a digital goods marketplace is selected and downloaded from a server associated with the digital goods marketplace. As shown in FIG. 6, in step S605 a request for download/installation of a web application is received. The request includes user device information. For example, a user of a client computing device (e.g., client computing device 302A), using a browser (e.g., window 312), scrolls through a listing of web applications (see FIG. 2 above). The user selects a web application by, for example, clicking on a button, an icon or link associated with the web application. At approximately the same time, the client computing device communicates information about the client computing device. Alternatively and/or in addition to, the digital marketplace (e.g., marketplace server 330) may request the information about the client computing device when accessing the digital marketplace. The information may include configurations, platforms and/or settings associated with the client computing device. For example, the information may include an operating system, hardware configurations (e.g., 32-bit or 64-bit) and language settings for the browser.

According to at least one implementation, the request for download/installation of a web application may be received as part of a syncing operation. Accordingly, the digital marketplace may receive the request from a sync server (e.g., sync server 350). The request may include a portion of the information about the client computing device (e.g., browser preferences or settings) from the sync server. Further, the digital marketplace (e.g., marketplace server 330) may be configured to revise the information about the client computing device such that device specific information received from the user device is merged with user preference information from the sync server to generate revised information about the client computing device. Alternatively, the sync server generates the information about the client computing device and communicates the information about the client computing device to the digital marketplace.

In step S610 a file location is determined based on the web application and the user device information. For example, the digital goods database 338 and/or the metadata database 340 and/or the manifest file may be searched (e.g., using installation selection module 346) using key words based on the web application and the user device information. For example, the digital goods database 338 or the metadata database 340 may be searched to find and retrieve the manifest file for the selected web application. Then the manifest file is searched based on the user device information. For example (referring to LISTING 2 above), if the user device is using a Windows 7® operating system and the browser settings indicate Spanish as the preferred language, a search string may be "Windows 7-Spanish". The search string is found. Therefore, the search may return "~base/Windows 7-Spanish" as the file location. If no search string is found, another search using "Default" as the search string may be performed. If there is a default location the default location is returned (e.g., ~base/Default).

If there is no default, no file location is returned and the web application may not be installed. Accordingly, control of the use of the web application may be limited to approved (e.g., those listed in the manifest file) user device configurations, platforms and/or settings. For example, if the web application has been tested to operate correctly on 32-bit systems, but not 64-bit systems, a developer may limit use to client computing devices with 32-bit systems and exclude 64-bit systems using the manifest file (e.g., limiting entries and not having a default). In an alternate implementation, search string indicating the configuration, platform and/or settings a stored in relation to the file location in a searchable (e.g., relational) database (e.g., the digital goods database 338 and/or the metadata database 340). In this implementation, the installation selection module 346 may search the searchable database for the file location using the search string as a key.

In step S615 the web application is downloaded/installed using files stored in the file location. For example, the files (including the manifest file) stored in the returned file location are downloaded to the client computing device 302A. The installation may include associating the files, a portion of the files or the web application with a web browser. In an example implementation, the server (e.g., marketplace server 330) generates a uniform resource locator (URL) link and communicates the URL to an install application associated with the client computing device 302A. The URL is an address of the file location (e.g., points to the folder on the server) and the install application downloads the files stored in the file location.

According to at least one implementation, the web application is downloaded/installed directly (via the network 370) to the client computing device. In an alternative implementation, the web application is communicated to the sync server and the web application is downloaded/installed to the client computing device by the sync server.

FIG. 7 is a flowchart of a process for distribution of user device configured web applications. In FIG. 7, a web application configured as a user device configured web application available for download from a digital goods marketplace has add-on features selected and downloaded by a server associated with the digital goods marketplace or downloaded by a client computing device. The steps associated with FIG. 7 may be performed automatically by the user device. In other words, the steps of FIG. 7 may be performed as a background process without interaction with a user of the user device.

As shown in FIG. 7, in step S705 a request for download/installation of a portion of a web application is received. The request includes an application identification and information about the portion of the web application. For example, a server (e.g., marketplace server 330) receives a request indicating additional files associated with an application are to be downloaded to a client computing device. Alternatively, an install application executed by the client computing device receives the request from a web application executing on the client computing device.

The request may include an identification of the web application. The identification may be unique to the web application, the web application and the client computing device, the web application and a user of the client computing device, the web application and a browser operating on the client computing device, and the like. The request may also include an indication of the additional files. For example, the indication of the additional files may be associated with additional skill levels (e.g., levels 6-10) of a game application. The indication of the additional files may indicate a logical location of files to be downloaded.

The request may be generated by a web application operating on a client computing device (e.g., client computing device 302A). For example, the developer of the web application may include code (e.g., a script) for the web application that triggers the request. For example the code may monitor a current skill level of a user of the web application. If the skill level is approaching a last skill level for which a file was previously downloaded (e.g., skill level 4 out of 5 downloaded), the trigger may be generated. As discussed above the trigger may generate a request to a server and/or an install application operating on the computer device.

In step S710 a file location based on the application identification and the portion of the web application is determined. For example, the server (e.g., marketplace server 330) may use the application identification and the information about the portion of the web application to generate a logical file location for the additional files. Referring to FIG. 4, the server may generate a logical file location referencing a folder associated with node 412b. Alternatively and/or in addition, the server may generate a uniform resource locator (URL) link and communicate the URL to an install application associated with the client computing device 302A. The URL is an address of the file location (e.g., points to the folder on the server) and the install application downloads the files stored in the file location. Alternatively, the install application generates a uniform resource locator (URL) link based on the application identification and the information about the portion of the web application In step S715 the portion of the web application is downloaded/installed using files stored in the file location. For example, the server can download the additional files directly to the client computing device using the URL or logical file location. Alternatively, the install application can downloads the additional files using the URL.

Figure 8:
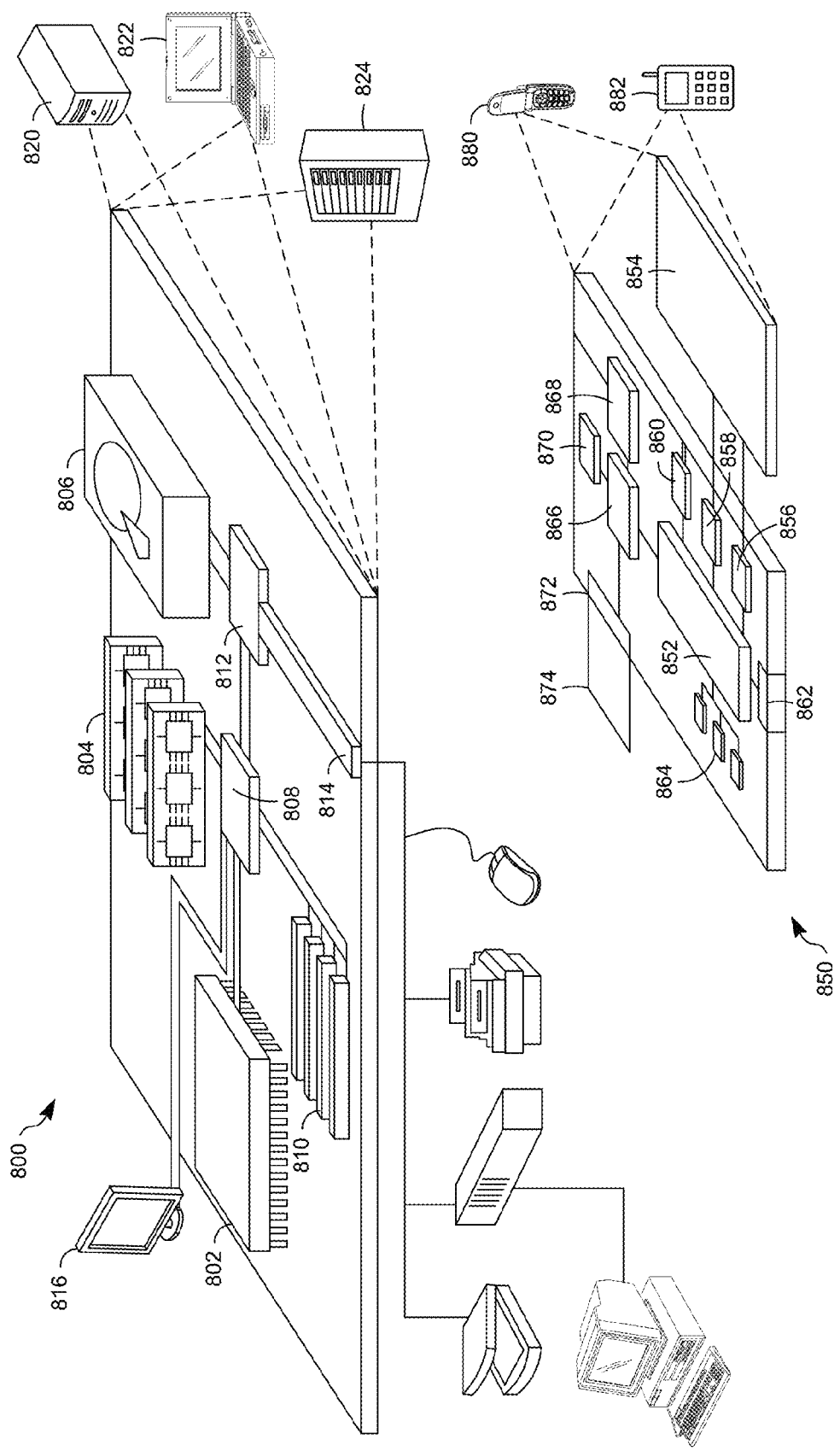
FIG. 8 is a schematic diagram of a computer system that can be used for embedding a web application gallery.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a BLUETOOTH, WiFi, or other such transceiver (not shown). In addition, GPS (Global Positioning System) receiver module 860 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made to the implementations described herein.

In addition, the logic flows depicted in the figures do not require the particular order shown, or sequential order. In addition, other steps may be provided, or steps may be eliminated, from the described flows, and other components may be added to, or removed from, the described systems. Accordingly, other implementations are within the scope of the following claims.

What is claimed is:

1. A method for installation of user device configured web applications, the method comprising:
   storing a plurality of first files in a plurality of first logical locations, each first logical location of the plurality of first logical locations being associated with at least one of a configuration, a platform and a setting associated with at least one potential user device, each of the plurality of first files being associated with execution of a corresponding web application;
   storing a plurality of second files in a plurality of second logical locations, each second logical location of the plurality of second logical locations being associated with at least one of a configuration, a platform and a setting associated with at least one potential user device, each of the plurality of second files being configured to add features for execution of a corresponding web application;
   receiving, from a user device, a request to install a web application;
   determining information about the user device, including at least one of a configuration, a platform and a setting associated with the user device;
   determining whether a first logical location, from the plurality of first logical locations, exists for the requested web application for the user device, wherein the determination is based on the web application and at least one of the configuration, the platform and the setting associated with the user device by:
      generating a search term based on at least one of the configuration, the platform and the setting associated with the user device; and
      searching a manifest file associated with the web application for the search term;
   upon determining the first logical location exists, selecting the first logical location as including files associated with executing the web application on the user device;
   upon determining the first logical location does not exist, determining whether a default logical location exists;
   upon determining the default logical location exists, selecting the default logical location as including files associated with executing the web application on the user device;
   upon determining one of the first logical location exists or the default location exists,
      determining a second logical location, from the plurality of second logical locations, the second logical location excluding at least one of the plurality of second files based on at least one of the configuration, the platform and the setting associated with the user device, and
      providing files stored in the determined first logical location or the determined default logical location and files stored in the determined second logical location to the user device for installation of the web application.

2. The method of claim 1, wherein
   the manifest file associated with the web application includes an entry corresponding to the plurality of second logical locations, and
   determining the second logical location includes:
      generating a search term based on at least one of the configuration, the platform and the setting associated with the user device;
      searching the manifest file for the search term; and
      returning a portion of the entry if the manifest includes the search term, the portion of the entry being a logical location of files for the web application.

3. The method of claim 1, wherein
   determining the second logical location includes:
      generating a search term based on at least one of the configuration, the platform and the setting associated with the user device;
      searching a database for the search term; and
      returning a logical location of files for the web application if the database includes a match for the search term.

4. The method of claim 1, wherein
   installing the web application includes using a first portion of files stored in the determined first logical location and using a second portion of files stored in the determined second logical location, the method further comprising:
   receiving a request to download a third portion of files for the web application, the request including an identification of the web application and information associated with the third portion of files,
   determining a third logical location based on the identification of the web application and the third portion of files, and
   downloading the third portion of files from the determined third logical location.

5. The method of claim 4, wherein the determining of the third logical location includes generating a uniform resource locator.

6. The method of claim 4, wherein
   the receiving of the request to download the third portion of files includes receiving the request at an install application executed by the user device, the method further comprising:

generating a uniform resource locator (URL) based on the identification of the web application and the third portion of files, and downloading the third portion of files includes using the URL to retrieve the third portion of files from the third logical location.

7. A method for distributing user device configured web applications, the method comprising:

receiving user device specific web application code, the user device specific web application code being developed based on at least one of a configuration, a platform and a setting associated with a potential user device;

storing the user device specific web application code in an organized file system, the organized file system being based on at least one of the configuration, the platform and the setting associated with the potential user device, the organized file system including:

a plurality of first logical locations, including a first logical location associated with the at least one of the configuration, the platform and the setting associated with the potential user device and configured to store files associated with executing the web application, and a second logical location configured to store a plurality of files that add features to the web application, the second logical location being organized to exclude at least one of the plurality of files based on at least one of the configuration, the platform and the setting associated with a user device requesting installation of the web application;

receiving a manifest file for a web application based on the user device specific web application code, the manifest file including an entry corresponding to the organized file system, if the web application includes user device specific web application code for a configuration, platform and setting combination, the manifest file including a user-device specific entry referencing the first logical location for the configuration, platform and setting combination, and if the web application includes default user device specific web application code, the manifest file including a default entry referencing a first logical location, from the plurality of first logical locations, that is different than the first logical location referenced in the user-device specific entry; and exposing the web application via a digital goods marketplace server.

8. The method of claim 7, wherein the organized file system is further organized based on features associated with the web application.

9. The method of claim 7, wherein the user device specific web application code is stored in the organized file system based on different operating systems of user devices that can execute the web application.

10. The method of claim 7, wherein the user device specific web application code is stored in the organized file system based on languages associated with browsers of user devices.

11. The method of claim 7, wherein the user device specific web application code is stored in the organized file system based on a 32-bit or 64-bit architecture of user devices.

12. The method of claim 7, further comprising:

determining a logical location of stored files for a requested web application based on the requested web application and at least one of the configuration, the platform and the setting associated with the user device; and installing the requested web application using files stored in the determined logical location.

13. A non-transitory computer readable medium storing code segments, that when executed by a processor, cause the processor to perform steps comprising:

storing a plurality of first files in a plurality of first logical locations, each first logical location of the plurality of first logical locations being associated with at least one of a configuration, a platform and a setting associated with at least one potential user device, each of the plurality of first files being associated with execution of a corresponding web application;

storing a plurality of second files in a plurality of second logical locations, wherein the storing of the plurality of second files is based on at least one of a configuration, a platform and a setting associated with at least one potential user device, each of the plurality of second files being configured to add features for execution of a corresponding web application;

receiving, from a user device, a request to install a web application;

determining information about the user device, including at least one of a configuration, a platform and a setting associated with the user device;

determining whether a first logical location, from the plurality of first logical locations, exists for the requested web application and the user device, wherein the determination is based on the web application and at least one of the configuration, the platform and the setting associated with the user device by:

generating a search term based on at least one of the configuration, the platform and the setting associated with the user device; and searching a manifest file associated with the web application for the search term;

upon determining the first logical location exists, selecting the first logical location as including files associated with executing the web application on the user device;

upon determining the first logical location does not exist, determining whether a default logical location exists;

upon determining the default logical location exists, selecting the default logical location as including files associated with executing the web application on the user device;

upon determining one of the first logical location exists or the default logical location exists, determining a second logical location, from the plurality of second logical locations, the second logical location excluding at least one of the plurality of second files based on at least one of the configuration, the platform and the setting associated with the user device, and providing files stored in the determined first logical location or the determined default location and files stored in the determined second logical location to the user device for installation of the web application.

14. The non-transitory computer readable medium of claim 13, wherein the manifest file associated with the web application includes an entry corresponding to the plurality of second logical locations, and determining the second logical location includes:
- generating a search term based on at least one of the configuration, the platform and the setting associated with the user device;
- searching the manifest file for the search term; and
- returning a portion of the entry if the manifest includes the search term, the portion of the entry being a logical location of files for the web application.

15. The non-transitory computer readable medium of claim 13, wherein determining the logical location includes:
- generating a search term based on at least one of the configuration, the platform and the setting associated with the user device;
- searching a database for the search term; and
- returning a logical location of files for the web application if the database includes a match for the search term.

16. The non-transitory computer readable medium of claim 13, wherein
- installing the web application includes using a first portion of files stored in the determined first logical location and using a second portion of files stored in the determined second logical location, the steps further comprising:
- receiving a request to download a third portion of files for the web application, the request including an identification of the web application and information associated with the third portion of files,
- determining a third logical location based on the identification of the web application and the third portion of files, and
- downloading the third portion of files from the determined third logical location.

17. The non-transitory computer readable medium of claim 16, wherein the determining of the third logical location includes generating a uniform resource locator.

18. The non-transitory computer readable medium of claim 16, wherein
- the receiving of the request to download the third portion of files includes receiving the request at an install application executed by the user device, the steps further comprising:
- generating a uniform resource locator (URL) based on the identification of the web application and the third portion of files, and
- downloading the third portion of files includes using the URL to retrieve the third portion of files from the third logical location.

* * * * *